J. HURST & A. MYERS.
NON-SLIPPING DEVICE.
APPLICATION FILED JUNE 17, 1910.
968,767.
Patented Aug. 30, 1910.
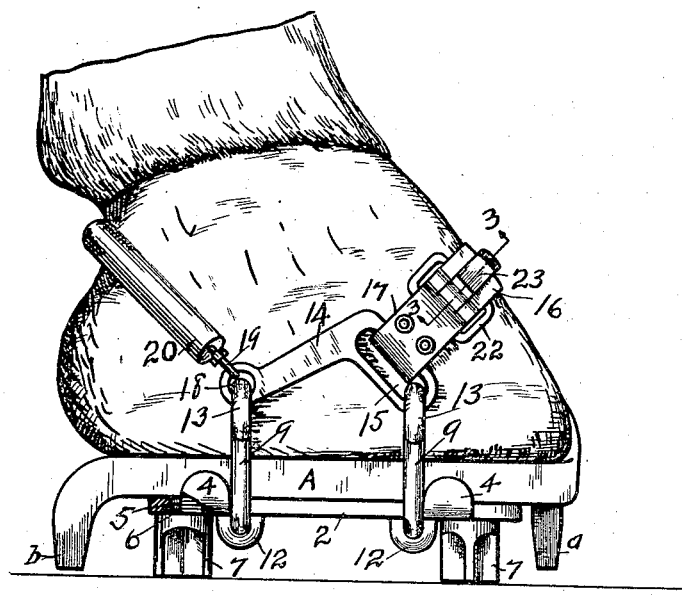
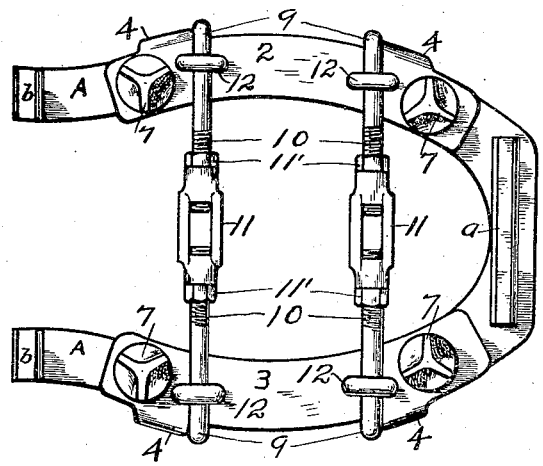
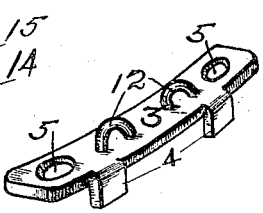
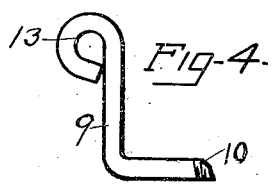
WITNESSES:
INVENTORS.
JACOB HURST
BY ANTHONY MYERS.
ATTORNEY.

UNITED STATES PATENT OFFICE.

JACOB HURST AND ANTHONY MYERS, OF SYRACUSE, NEW YORK.

NON-SLIPPING DEVICE.

968,767.  Specification of Letters Patent.  Patented Aug. 30, 1910.

Application filed June 17, 1910. Serial No. 567,383.

*To all whom it may concern:*

Be it known that we, JACOB HURST and ANTHONY MYERS, citizens of the United States, residing at Syracuse, in the county of Onondaga and State of New York, have invented certain new and useful Improvements in Non-Slipping Devices, of which the following is a specification.

This invention relates to improvements in non-slipping devices, and has for its object to provide a strong, light and durable device for temporary attachment to horse shoes.

A particular object of the invention is to provide a device for attachment to horse shoes for the purpose of preventing the animal from slipping on wet or icy pavements. And a further object of the invention is to provide a device of the class which may be readily and quickly applied to and removed from the animal's foot, as well as, novel and simple means for adjustably securing the device in place.

The invention consists of the features and parts set forth in the detailed description which follows, illustrated in the accompanying drawing, and then particularly pointed out in the claims.

In the drawing, Figure 1 is a side view of the hoof with the non-slipping device applied. Fig. 2 is a bottom plan view of the device attached to the shoe. Fig. 3 is an enlarged sectional view taken on line 3—3 of Fig. 1, showing the construction and arrangement of the adjustable securing strap.
Fig. 4 is an enlarged detail of one of the adjustable connecting rods. Fig. 5 is a perspective view (inverted) of one of the calk plates.

Similar characters of reference are assigned to corresponding parts throughout the several views.

In the drawing, 2 and 3 represent metallic calk plates or soles, each of which is curved to correspond with the curve of the horse shoe or hoof. The plates 2 and 3 are preferably made of steel or other durable and tough metal, formed exactly alike, and are therefore reversible and interchangeable. At or near the end of the plates 2 and 3 the metal at the outer edge of the plates is bent upwardly at right angles to the plane of the plates, to form integral lugs 4, 4, for engaging and gripping the outer edge or side of the horse shoe. Two of these lugs are formed on each plate, and they are spaced far enough apart to permit the plates to be applied to shoes of any curvature, and come to a firm bearing against the edge of the shoe. Near each end of the plates 2 and 3 are formed threaded perforations 5, into which are inserted the threaded ends 6 of metallic calks 7, which bear the weight of the animal and which, owing to their peculiar form and arrangement, prevent the animal from slipping when traveling upon wet or icy pavements or roadways. The free ends of the calks 7 are formed substantially Y-shaped in cross-section, as best seen in Fig. 2. These calks are preferably made longer than the usual toe and heel calks of the horse-shoes, so that when the device is applied to the animal's foot, the calks 7 will extend a quarter of an inch or more below the points of the shoe. The threads employed for connecting the calks of the plates are preferably of comparatively fine gage which allows the calks to be screwed in tight for preventing their displacement while in use. The calks 7 are all made alike and are also interchangeable.

The calk plates 2 and 3 are intended to be placed one on each side and underneath the shoe, and the plates are adjustably applied and secured to the shoe, by means of a series of connecting rods or parts 9, which are formed-up substantially L-shaped, having horizontal arms which are threaded at 10, for adjustably connecting with turnbuckles 11, which are disposed beneath the hoof and between the plates 2 and 3. The rods 9 pass through and are pivotally held in place by perforated lugs 12, which depend from the bottoms of the calk plates, and which are preferably formed integrally with said plates. The free ends of the vertical arms of the rods 9 are formed into loops or eyes 13, which connect with links 14, one of which is disposed on each side of the hoof a short distance above the shoe. The links 14 are of peculiar shape, preferably consisting of metallic plates, which are slightly curved to conform to the curvature of the hoof, and each having a slot 15, at one end, to receive the looped upper end of the forward connecting rod 9, and also the adjustable securing straps 16 and 17. The opposite or rear ends of the links are perforated at 18, to receive the loops 13 of the rear pair of rods 9, and also the ends of a flexible rear guard or strap 19. In practice the guard 19 is preferably made of wire and then covered with rubber or other soft material 20 for preventing the chafing of the hoof. The strap 17 is connected at one end to one of the links 14, the other end being fitted with a metallic loop 22 which engages an eccentrically arranged clasp 23, by means of which the device may be readily and quickly applied to or removed from the hoof.

In practice the plates 2 and 3 are made up in two or three different sizes for convenience in attaching to shoes of different size and shape, as well as, for proportioning the weight and strength of the device to heavy and light animals. The calks 7 are also made proportionately lighter and heavier to correspond to the sizes of the plates.

In applying our device, the latch or clasp 23 is first released so as to disconnect the straps 16 and 17, for permitting the device to be slipped over the hoof, the turn-buckles are then operated in the direction to spread the plates 2 and 3. The plates 2 and 3 are next placed in position against the bottom of the shoe and the rear strap or guard 19 is swung upwardly against the rear side of the hoof. The turnbuckles may then be turned in the opposite direction for drawing the plates toward each other, until the lugs 4, 4, are made to tightly grip the outer edges of the shoe. When these operations are completed the device will cling to the shoe without any further assistance. To prevent the accidental displacement or loss of the non-slipping device while the animal is being driven about, the straps 16 and 17 should be connected at the front of the hoof by means of the clasp 23. After the strap 16 is once adjusted by means of the buckle 21 and the turnbuckle adjustment has been arranged for a certain animal, the device may be removed and reapplied, when needed, in a few seconds' time.

Having thus described our invention, what we claim as new and desire to secure by Letters Patent, is—

1. A non-slipping device, comprising a pair of auxiliary calk plates adapted for mounting on the opposite bottom sides of a horseshoe, said plates curved to conform to the curvature of the shoe, and having integral means for gripping the outer edges of the shoe, an adjustable clamping means for connecting said plates, comprising a pair of L-shaped rods carried by each plate, and a pair of turnbuckles connecting the corresponding rods of each plate, said turnbuckles positioned midway between said plates and adapted to contract and spread the said plates for clamping the plates to, or releasing them from, the horseshoe, the vertical arms of said rods passing upwardly outside of the plates and the horseshoe, the uppermost ends of said rods formed into loops, a perforated link connecting the looped ends of the rods of each plate, said links curved to conform to the curvature of the hoof, and a front and a rear strap connecting the opposite ends of said links for fastening said device to the hoof.

2. In a non-slipping device, the combination with a pair of plates for mounting on the opposite bottom sides of a horseshoe, each plate having a pair of lugs for gripping the outer edge of the horseshoe and having a pair of detachable calks which project below the calks of the horseshoe, of an adjustable connecting means, comprising a pair of threaded rods disposed horizontally beneath each plate and arranged at right angles to said plates, the front and rear rods of each plate disposed in the same line and plane, but having their free ends spaced apart, and a turnbuckle connecting the said front and rear pairs of rods, the said turnbuckles arranged parallel to each other and adapted to be manipulated for rigidly clamping said plates to horseshoes of different widths, substantially as shown and described.

3. A non-slipping device, comprising two plates adapted for mounting upon the opposite under sides of a horseshoe between the toe and heel calks of the shoe, said plates having the same curvature as the arms of the shoe, and also having upturned lugs for engaging the outer edges of the shoe, a pair of calks connected to each plate by means of threads, said calks disposed near the ends of each plate and projecting below the calk-points of the shoe, a pair of turn-buckles for reciprocally moving said plates toward or away from each other in a horizontal plane for adjustably applying said plates to or releasing them from the horseshoe, and means for adjustably fastening said device to the hoof.

4. A non-slipping device for horses, comprising plates adapted to be mounted on the opposite sides of the bottom of a horseshoe, having upturned portions for engaging the outer side edges of the horseshoe, means for adjusting said plates to shoes of different widths and for rigidly clamping said plates to the horseshoe, said means comprising a pair of rods pivotally connected to each plate, and a pair of turnbuckles connecting the rods of one plate to the rods of the other plate, the said turnbuckles and one arm of each rod disposed beneath the animal's foot, substantially at right angles to said plates, and a pair of flexible straps for securing said device to the hoof.

5. A non-slipping device, comprising oppositely curved plates capable of being mounted on the bottom of a horseshoe, each plate having lugs for gripping the outer edge of the horseshoe, and each plate having a threaded hole near each of its opposite ends, a detachable calk having a threaded shank inserted upwardly in each threaded hole in said plates, a pair of L-shaped rods carried by each plate, a pair of turnbuckles for connecting the rods of one plate with the rods of the opposite plate, and for adjustably clamping said plates to the opposite sides of the horseshoe, the said rods and said turnbuckles disposed between the forward and rear calks of said plates, links connecting the upper ends of said rods at each side of the hoof, and a pair of straps for connecting the opposite ends of said links, for attaching the device to the hoof.

6. A non-slipping device for horseshoes, comprising a pair of calk-plates capable of being applied to the bottom of the horseshoe, and having means for gripping the outer edges of the shoe, a pair of detachable Y-shaped calks screwed into the bottoms of each of said plates, a pair of L-shaped rods carried by each of said plates, the horizontal arms of said rods threaded and extending transversely beneath the shoe, a pair of turnbuckles disposed between said plates and connecting the corresponding rods of said plates, adapted for clamping said plates to the horseshoe, a link for connecting the vertical arms of the rods of each plate above the horseshoe, a strap connecting the rear ends of said links, and an adjustable strap for connecting the opposite ends of said links, substantially as described.

7. A non slipping device, comprising a pair of reversely curved plates capable of being mounted on the bottom of a horseshoe between the toe and heel calks of the shoe, each plate arranged for gripping the outer edge of the shoe, and each plate fitted with a pair of depending Y-shaped calks extending below the calks of the shoe for engaging the pavement independent of said shoe-calks, a front and a rear connecting rod carried by each plate, each rod having a threaded arm disposed horizontally beneath the foot, the rods of one plate alining with the like rods of the other plate, and a turnbuckle for connecting the front and rear pairs of rods, the said turnbuckles capable of being manipulated for moving said plates toward or away from each other for attaching said plates to or for releasing them from the horseshoe.

8. A non-slipping device comprising a pair of plates adapted for mounting upon the under side of a horseshoe, each plate arranged to support a pair of spaced detachable calks, and having a plurality of upturned grip-lugs for engaging the lateral edge of the shoe, said plates being curved in opposite directions to conform to the curvature of the horseshoe, said plates being shorter than the distance from the toe-calk to either of the heel-calks of the horseshoe for affording suitable adjustment, the said plates having like depending perforated lugs arranged on their undersides and disposed between the detachable calks, a pair of connecting rods inserted through the depending lugs of each plate and a pair of turnbuckles disposed transversely beneath the animal's foot, for connecting the front and rear rods of each plate, adapted for drawing said plates toward each other for securing the device to the horseshoe, the said turnbuckles and said connecting-rods arranged for adjustably applying said plates to horseshoes of varying widths.

9. A non-slipping device, comprising oppositely curved plates adapted to be applied to the opposite bottom sides of a horseshoe, each plate having a pair of lugs for engaging the outer edges of the horseshoe, a pair of spaced calks depending from each of said plates, said calks being of greater length than the calks of the horseshoe for receiving the weight of the animal, a pair of turnbuckles arranged between said plates and at right angles thereto, a pair of L-shaped rods carried by each plate, the horizontal arms thereof passing beneath said plates and connecting with the opposite ends of said turnbuckles, the vertical arms of said rods disposed outside of said plates and capable of drawing said plates toward each other for clamping them to the shoe, by the manipulation of the turnbuckles in one direction, the said plates capable of being spread apart by hand when the turnbuckles are manipulated in the opposite direction, and means for adjustably securing the device to the animal's hoof.

10. A non-slipping device adapted to be applied to a horseshoe, and comprising a pair of separate calk-plates curved oppositely to conform to the curved sides of the horseshoe, each of said plates having spaced upwardly projecting grip-lugs for engaging and gripping the outer edge of the horseshoe, each of said plates having spaced downwardly projecting perforated lugs arranged on the bottom surfaces, a pair of interchangeable calks screwed into the bottoms of each of said plates, the said calks adapted to project below the calks of the horseshoe, and disposed between the toe and the heel calks of the horseshoe, a pair of oppositely formed connecting-rods pivoted in the perforated lugs of each calk-plate, the horizontal arms of said rods being threaded and disposed beneath the animal's foot, a pair of turnbuckles for connecting the rods of one plate with the rods of the other plate and for adjustably clamping said plates to the horseshoe, a link, connecting the vertical arms of the connecting-rods of each plate, the said links disposed on the opposite sides of the hoof above the horseshoe, a flexible strap connecting with said links and passing around the rear side of the hoof, and an adjustable front strap connecting the opposite ends of said links.

In testimony whereof we affix our signatures in presence of two witnesses.

JACOB HURST.
ANTHONY MYERS.

Witnesses:
HARRY DE WALLACE,
ROBERT L. WALLACE.